(12) United States Patent
Hofmann et al.

(10) Patent No.: US 6,554,600 B1
(45) Date of Patent: Apr. 29, 2003

(54) DEVICE FOR PRODUCING A THREE-DIMENSIONAL OBJECT, ESPECIALLY A LASER SINTERING MACHINE

(75) Inventors: Robert Hofmann, Lichtenfels (DE); Harald Turck, München (DE); Thomas Mattes, Germering (DE)

(73) Assignee: EOS GmbH Electro Optical Systems (DE)

(*) Notice: Subject to any disclaimer, the term of this patent is extended or adjusted under 35 U.S.C. 154(b) by 0 days.

(21) Appl. No.: 09/581,381

(22) PCT Filed: Aug. 20, 1999

(86) PCT No.: PCT/EP99/06130

§ 371 (c)(1),
(2), (4) Date: Aug. 7, 2000

(87) PCT Pub. No.: WO00/21736

PCT Pub. Date: Apr. 20, 2000

(30) Foreign Application Priority Data

Oct. 9, 1998 (DE) .......................................... 198 46 478

(51) Int. Cl.[7] .............................................. B29C 35/08
(52) U.S. Cl. .................... 425/174.4; 264/497; 425/182
(58) Field of Search .................................. 264/308, 497; 425/174.4, 182, 375, 447

(56) References Cited

U.S. PATENT DOCUMENTS

| | | | | |
|---|---|---|---|---|
| 4,681,552 A | * | 7/1987 | Lenk .......................... 425/72 |
| 5,133,987 A | * | 7/1992 | Spence et al. ............. 425/53.1 |
| 5,252,264 A | * | 10/1993 | Forderhase et al. ........... 264/22 |
| 5,474,719 A | * | 12/1995 | Fan et al. .................... 264/401 |
| 5,506,607 A | * | 4/1996 | Sanders, Jr. et al. ............ 347/1 |
| 5,545,367 A | * | 8/1996 | Bae et al. .................... 264/401 |
| 5,609,814 A | * | 3/1997 | Takano ........................ 264/401 |
| 5,658,412 A | * | 8/1997 | Retallick et al. .......... 156/272.8 |
| 5,730,925 A | | 3/1998 | Mattes et al. ................ 264/497 |
| 5,753,274 A | * | 5/1998 | Wilkening et al. ........ 425/174.4 |
| 5,980,812 A | * | 11/1999 | Lawton ........................ 264/401 |
| 6,261,077 B1 | * | 7/2001 | Bishop et al. ............. 425/174.4 |
| 6,261,493 B1 | * | 7/2001 | Gaylo et al. .................. 264/86 |

FOREIGN PATENT DOCUMENTS

| | | |
|---|---|---|
| EP | 0 542 729 A2 | 5/1993 |
| WO | WO 96/29192 | 9/1996 |

* cited by examiner

*Primary Examiner*—Jan H. Silbaugh
*Assistant Examiner*—Emmanuel Luk
(74) *Attorney, Agent, or Firm*—George W. Neuner, Esq.; Edwards & Angell, LLP

(57) ABSTRACT

An apparatus for producing a three-dimensional part by successive layer-by-layer solidification of a solidifiable material, which is solidified at locations corresponding to the cross section of the part is described. The apparatus has a machine housing and a building space provided in the machine housing. An interchangeable container forms a delimiting frame for the material within the building space. The container has a work piece platform. The work piece platform is supported on a supporting device during operation of the apparatus. Preferably, the interchangeable container has a rear side wall with a recess extending vertically, and the supporting device engages the work piece platform through the recess.

34 Claims, 9 Drawing Sheets

Detail X

DEVICE FOR PRODUCING A THREE-DIMENSIONAL OBJECT, ESPECIALLY A LASER SINTERING MACHINE

FIELD OF THE INVENTION

The invention relates to an apparatus for producing a three-dimensional part, particularly a laser sintering machine and, more particularly, a synthetic material laser sintering machine.

BACKGROUND OF THE INVENTION

Known laser sintering machines comprise a machine housing in which a sinter building space or process space is arranged. In the upper region of this building space, the exit optics of a sintering laser in the form of a scanner are located. The scanner constitutes the optical system for deflecting the laser beam providing the energy required for sintering the sinter material (thermoplast powder). Below the optical system, there is a work piece platform being height adjustable and above which material feeding means including a coating device are provided, designed for feeding powdery sinter material from a reservoir in the process area of the work piece platform.

Laser sintering machines in the prior art, the part is built in a layer-by-layer fashion in the inner region of the height-adjustable work piece platform. However, in order to prevent the thermoplast powder, which is not illuminated and thus not sintered, from falling off the work piece platform, a rim serving as a delimitation of the work piece platform is formed, i.e. sintered, substantially simultaneously at the periphery of the platform.

This approach has drawbacks in several respects.

Building the rim on the work piece platform requires additional exposure time and also, additional thermoplast powder is needed which can no longer be used.

In addition, as a particular drawback, in the case of a building error, a sufficiently strong box-like delimiting structure is not formed and may lead to deformations and thus to rejects even before or, at the latest, while withdrawing the part from the height-adjustable platform.

Furthermore, when withdrawing the work piece platform from the laser sintering machine, rim fractures or rim damages cause some powder to drop into the lower region of the laser sintering machine, soiling this portion and thus causing additional servicing and down-time of the laser sintering machine.

As a further serious drawback to all the above, the sintered part as well as the delimitation have to remain in the laser sintering machine for a certain period after the actual production process, in order to obtain a degree of curing and cooling such that deformations of the edge and of the part will no longer occur during withdrawal. As a rule of thumb associated herewith, a building time of 20 hours would also require a cooling time of roughly 20 hours for the built rim and the part, such that prior art laser sintering machines have relatively long down-times.

It is an object of the invention to from an apparatus for producing a three-dimensional part and particularly a laser sintering machine such that the amount of energy and material needed can be lowered and the down-time between two building processes can be significantly shortened.

SUMMARY OF THE INVENTION

The invention provides an apparatus for producing a three-dimensional part by successive layer-by-layer solidification of a solidifiable material at locations corresponding to the cross section of the part, and having a building space (3) provided in a machine housing, characterized in that an interchangeable container (12; 112) forming a delimiting frame for the material (9) can be inserted within said building space (3), in which a work piece platform (8; 108) is integrated and a supporting device is arranged, on which the work piece platform (8; 108) is supported and/or mounted during operation of the apparatus.

Preferred embodiments of the invention additionally include one or more of the following features:

(1) the work piece platform is adjustable in height within said delimiting frame and integrated in the interchangeable container as a container bottom; building space (3) is located in a machine housing and wherein exit optics (5) of a sintering laser are arranged in said building space (3) and said work piece platform (8) is arranged below said building space, and that material feeding means with a coating device (10) for feeding powdery sinter material (9) from a reservoir in the process area of said work piece platform (8) are provided;

(2) the work piece platform (8) can be latched to the side walls (14) of said interchangeable container (12); in a lower withdrawing position and the interchangeable container (12) can be withdrawn in the latched state from said building space (3) together with said work piece platform (8) forming its container bottom;

(3) the latching between the side walls (14) of said interchangeable container (12) and the work piece platform (8) is carried out by sliding plugs (25) insertable into bores aligned with respect to each other;

(4) the interchangeable container (12) in plan view has a substantially square or rectangular cross section and comprises four side walls (14) substantially perpendicular to each other, in which said work piece platform (8) is guided in a height-adjustable manner;

(5) the supporting device (20) for said work piece platform (8) is engaged through engagement recesses (33) in the rear side wall (14') and extending in the direction of displacement;

(6) the supporting device (20) for said work piece platform (8) is engaged through engagement recesses (33) in the rear side wall (14') and extending in the direction of displacement:

(7) the supporting device (20) is guided in the area of the machine rear wall;

(8) the supporting device (40) is incorporated in the lower portion of said interchangeable container (12) and is therefore a fixed component of said interchangeable container (12);

(9) the interchangeable container (12) can be inserted into guides (70) in the portion of the side walls (14) of said building space (3);

(10) the interchangeable container (12) is provided at its upper end with supporting angles (71) laterally extending away and resting on the guides (70) of said machine housing (2);

(11) the engagement recesses (33) are covered in a powder proof manner in the portion above said work piece platform (8);

(12) the sealing of said engagement recesses (33) is carried out by a roller shutter (34);

(13) the upper end (35) of said roller shutter (34) is mounted to the upper edge (36) of the rear side wall (14');

(14) the roller shutter (34) is a steel roller shutter;

(15) the work piece platform (8) is formed by two spaced bottoms arranged in parallel to each other, the upper bottom forming the work piece holder and the lower bottom resting on said supporting device (20);

(16) magnet elements (4) cooperating with said roller shutter (34) are arranged adjacent to said engagement recesses (33);

(17) the roller shutter (34) is guided by a deflection pulley (60) the rear edge of which is aligned with the inner surface of the rear side wall (14');

(18) a powder compression element is active between the inner sides (15) of the side walls (14) of said interchangeable container (12) and the outer edges of said work piece platform (8);

(19) the powder sealing element is formed by a silicone plate, the outer dimensions of which are adapted to the inner dimensions of said side walls (14) of said interchangeable container (12);

(20) the work piece platform (8) is connected to said supporting device (20) during the process;

(21) the interchangeable container (12; 112) comprises a recess (33; 133) through which the supporting !device (300; 30) is engaged and in which the supporting device can be displaced;

(22) the recess (33; 133) is sealed against said building space (3) such that no unsolidified material can escape;

(23) the recess (133) is formed in a slot-shaped manner in the direction of displacement of the supporting device and is sealed by means of a tape (200) mounted to the wall of said interchangeable container above said recess and being pressed against the container wall surrounding said recess (133) by said work piece platform (108);

(24) the tape (200), at its other end, is clamped in the region of the lower edge of said interchangeable container and has a constant length between the points at which it is clamped;

(25) the tape is tensioned at the lower side of said work piece platform via at least two slideways (202, 203) arranged in the vicinity of the edges of said work piece platform;

(26) the tape is formed as a steel tape;

(27) the supporting device (40) engages said interchangeable container (12; 112) from underneath and is connected with a telescoping linear guide for raising and lowering said work piece platform;

(28) a working plate (118) is provided in said building space (3), said working plate comprising a device (121) for clamping said interchangeable container (112) at the bottom side of said working plate (118);

(29) a coupling device (300) for coupling and decoupling said supporting device to said work piece platform (108) is provided;

(30) a controllable heating device is provided in said interchangeable container (12), particularly in its side walls (14) and/or said work piece platform (8);

(31) the supporting device is designed such that a space required for lowering said interchangeable container is provided without displacing said supporting device in the vertical direction; and

(32) the lifting and locking of said interchangeable container is carried out in a single movement and/or with a single mechanism.

According to a core aspect of the invention, an interchangeable container forming a delimiting frame is inserted into said sinter building space, said work piece platform being integrated in said interchangeable container as a bottom and a supporting device being arranged in said interchangeable container, on which said work piece platform is resting during operation of the laser sintering machine.

Thus, the novel interchangeable container insertable into said sinter building space is substantially composed of two core components, one being a shaft-like outer portion forming the delimiting frame and the other one being the regular work piece platform which is integrated in this shaft-like portion in a height-adjustable fashion.

When building the part in a layer-by-layer fashion, i.e. layer thickness by layer thickness, the container bottom within the delimiting frame is lowered gradually, and the area above the work piece platform is repeatedly filled with powdery sinter material, which is carried out in-a conventional manner by the coating device.

Advantageously, however, there is no need to also build a peripheral rim. It is fully sufficient to sinter only the actual work piece located within the sturdy interchangeable container and the sinter material, not being sintered, deposited therein and protected against deformation.

As soon as the last layer of the part is sintered, the work piece platform can be lowered via the supporting device into a lower portion and by means of locking elements such as sliding plugs which can be inserted into bores aligned with each other between the walls of the interchangeable container and the work piece platform, the container bottom is firmly connected with the container side walls. This connection may then be released from the supporting device and lifted off and withdrawn from the building space. This can be done trouble-free in the hot state. The cooling of the container, the part contained in it and the sinter material takes place outside the sintering machine.

Immediately after withdrawing the interchangeable container, a new interchangeable container can be inserted, its bottom connected with the supporting device and thereafter unlocked from the side walls of the interchangeable container. After a change-over time of about 15–20 minutes, the sintering machine is again ready for the next laser sintering job.

Therefore, the invention has several advantageous effects on the operation of such a sintering machine. On the one hand, building errors in the periphery do not result in the actual part ending up as a reject. On the other hand, the cooling times of the part and the material surrounding it are transfered out of the sintering machine.

The sintering machine is very rapidly made available again for a new job. Also, both sinter material and energy are saved.

Advantageously, the interchangeable container, as viewed from the top, has a substantially square or rectangular cross section and comprises four side walls substantially perpendicular to each other. Within these side walls, the work piece platform is guided in a height-adjustable manner.

Basically, it is possible to have the supporting device engage from underneath into the shaft of the container side walls or as well integrate it as an integral part into the interchangeable container. In order to provide stability when using a supporting device firmly mounted in the machine, the rear container wall of the interchangeable container preferably comprises engagement recesses extending in the displacement direction, i.e from the bottom to the top, through which a supporting device adjustable in height in the rear side wall portion of the building space can engage with support arms substantially extending in the horizontal direction. There are means provided for covering the engagement recesses in the area above the work piece platform in a powder proof manner.

The solution where the supporting device for supporting the work piece platform engages the interior of the interchangeable container by means of support arms through one of the side walls of the interchangeable container, is advantageous compared to a solution where one support arm engages the interchangeable container for supporting the work piece platform from underneath, since space which would have to be reserved for the supporting device below the interchangeable container can be saved and used as building space for building larger parts. The solution where the support arms or one support arm laterally engage the wall of the interchangeable container, however, always requires the sealing of the engagement recess for a support arm above the work piece platform in order to prevent powder from falling out.

Advantageously, in a first embodiment of the invention, this is achieved by a device for sealing in the form of a roller shutter secured to the upper edge of the interchangeable container and coming to rest on the inner side of the container wall and covering the engagement recesses when the work piece platform is lowered.

In order to guarantee sufficient sinter powder tightness, holding magnet elements cooperating with the steel roller shutter are arranged. Due to the holding magnet elements, the steel roller shutter closely fits the inside of the rear container wall such that no or only very little powder can fall into the lower machine portion.

In a second embodiment of the invention, the interchangeable container comprises a slot-shaped center recess on the rear wall extending in the longitudinal direction, with a support arm for supporting the work piece platform engaging into said recess. To seal this engagement recess in the area above the work piece platform, a tape, preferably made from steel, instead of the steel roller shutter is provided which is clamped at the upper edge of the rear wall and at the bottom of the interchangeable container, respectively, in a region substantially diagonally opposed to the upper edge. The steel tape is guided along the engagement recess and at the bottom side of the work piece platform and is tensioned via gliding cylinders. The steel tape has a fixed length between its clamping points and due to the guiding along the bottom side of the work piece platform, it is always pressed with the correct length against the engagement recess above the work piece platform. Compared to the embodiment using the steel roller shutter, the embodiment using the tape has the advantage that the tape is less expensive and can easily be replaced when worn or damaged. The tape is nearly free of forces. The previously described roller shutter, however, has a strong spring for winding. Nevertheless, with the tape, there is no need to lock the work piece platform in the lower position. The friction of the seal is sufficient to stabilize the work piece platform.

In the upper portion of the container, holding or hooking elements are provided to limit the replacement process to only a few manual steps. It is of particular advantage if the interchangeable container can be inserted in a drawer-like fashion into the process space, with guides being provided in the region of the side walls of the process space and the interchangeable container being equipped at its upper end with supporting angles and the like laterally extending away and resting on the guides of the process space.

In an alternative embodiment, the laterally protruding supporting angles provided at the interchangeable container are not resting on guides in the region of the lateral walls of the process space, but are fastened from underneath, lifted and pressed against the working plate by a clamping device which is provided at the working plate provided in the process space and extending horizontally and having a recess corresponding to the contour of the interchangeable container.

Preferably, the support arm comprises a coupling device permitting very easy coupling to and decoupling from the work piece platform.

Preferably, a hoist is further provided, which can be driven into or next to the building space and on which the interchangeable container can be transported.

In the prior art laser sintering machines, the entire building space is heated. This type of building space heating is relatively slow and energy intensive. Using a heating device which is integrated into the interchangeable container, the bottom thereof or its walls, the heating can be suitably adapted to the thermal requirements of the laser sintering process.

BRIEF DESCRIPTION OF THE DRAWINGS

The invention will be discussed in more detail by exemplary embodiments with reference to the drawings, wherein.

DETAILED DESCRIPTION OF THE INVENTION AND PREFERRED EMBODIMENTS

Figure 2:
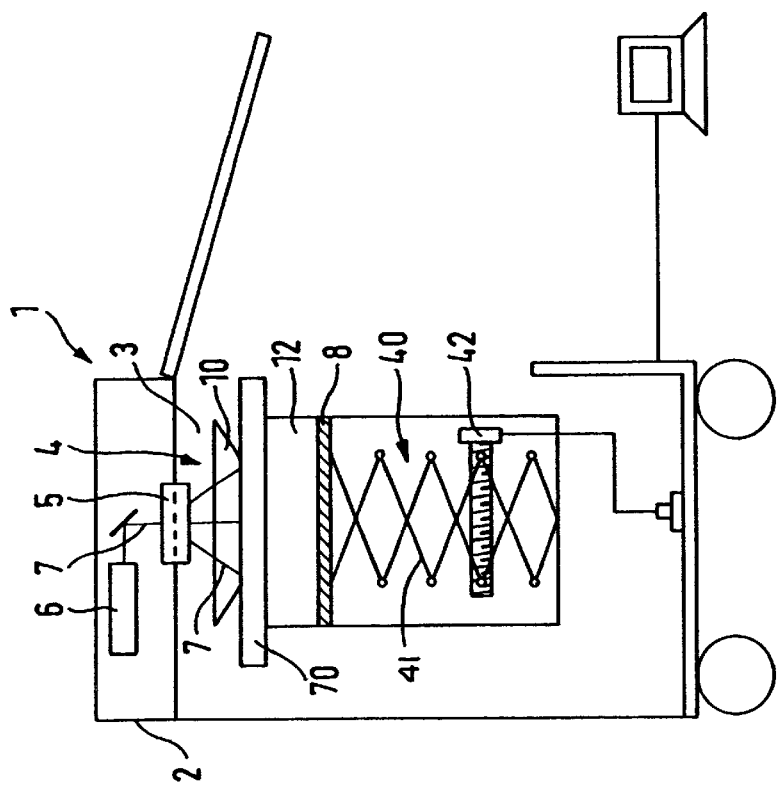
FIG. 2 is a sectional view similar to FIG. 1, but having a modified interchangeable container.

Referring to the figures, the laser sintering machine 1 comprises a machine housing 2 in which a building space 3 is located. In the upper region 4 of the building space 3, a scanner 5 of a sintering laser 6 is arranged for deflecting the laser beam 7 and focussing it onto the work piece platform 8 or the sinter material 9 deposited thereon which is deposited onto the work piece platform 8 in a layer-by-layer fashion by means of a coating device 10. The sinter material 9 is supplied to the coating device 10 from a reservoir (not shown).

In the lower region 11 of the building space 3, an interchangeable container 12 is inserted which is composed of side walls 14 and the work piece platform 8 which can be displaced within the side walls 14, i.e. within the shaft formed by the latter, in an upward and downward direction.

In order to allow the work piece platform 8 to be adjustable in height, a supporting device 20 is provided on which the work piece platform 8 is resting during operation of the laser sintering machine and on which the work piece platform 8 is mounted.

Figure 1:
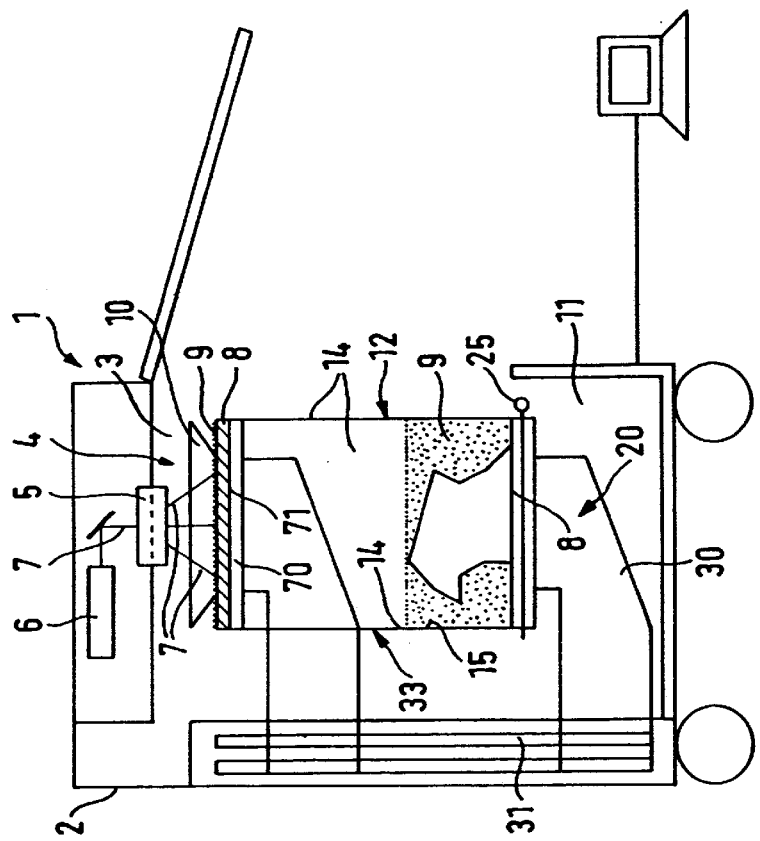
FIG. 1 is a schematic and sectional side view of a laser sintering machine having an interchangeable container.

Referring to the embodiment illustrated in FIG. 1, the work piece platform is in the uppermost position within the interchangeable container.

Figure 4:
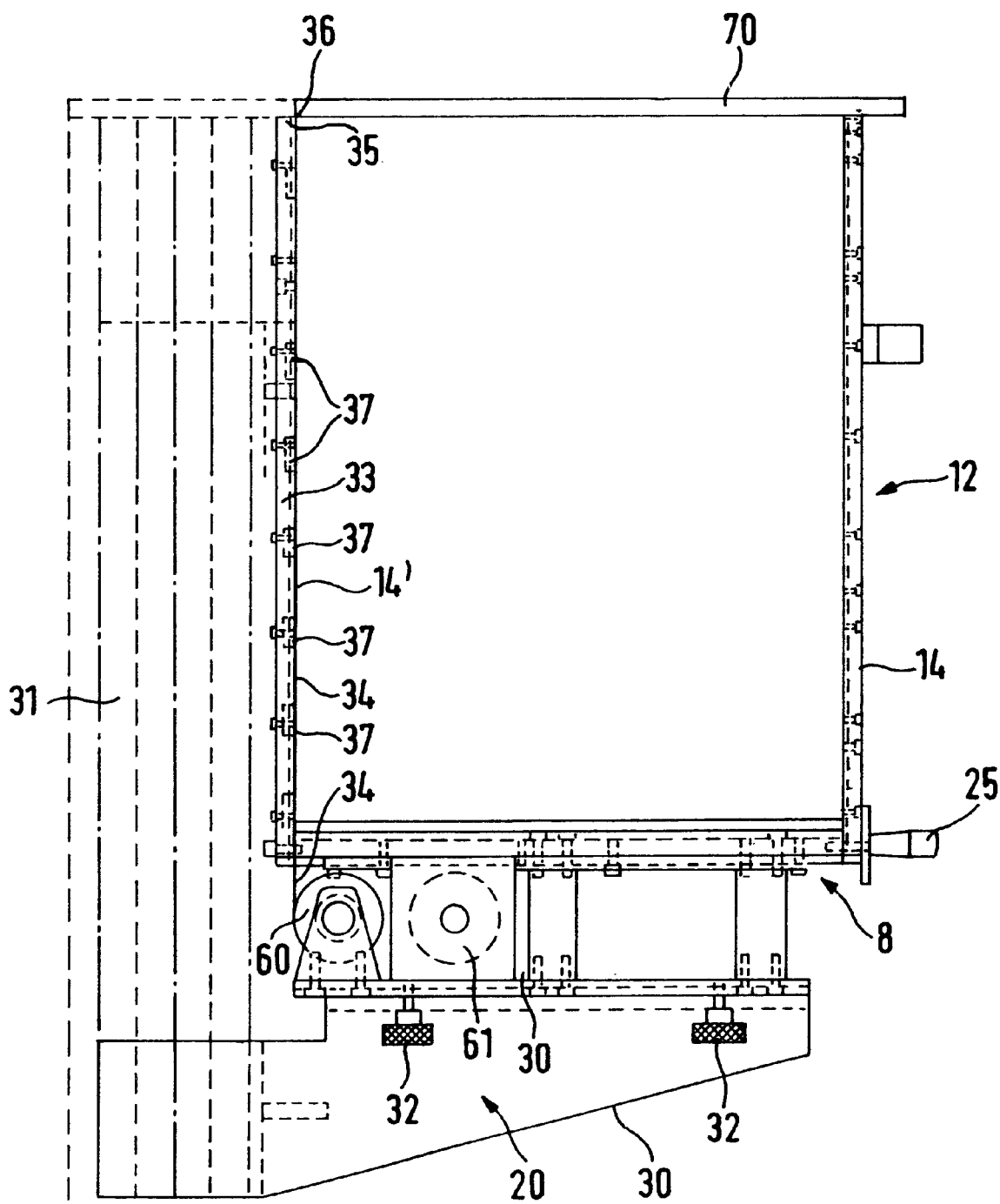
FIG. 4 is a detailed view according to FIG. 3 with the work piece platform in a lower and locked position.

Referring to the embodiment illustrated in FIG. 4 and showing a detailed view of an embodiment of an interchangeable container 12, the work piece platform 8 is latched with the side walls 14 in the lower withdrawal position, and in this state, the interchangeable container 12 in its latched state together with the work piece platform 8 forming the bottom plate thereof can be withdrawn from the building space 3. Sliding plugs 25 which can be inserted into bores aligned to each other within the side walls 14 and into the interchangeable container 12, are provided for latching the side walls 14 of the interchangeable container 12 to the work piece platform 8. Thus, the interchangeable container 12 forms an integral unit which can be lifted off the supporting device 20.

Figure 3:
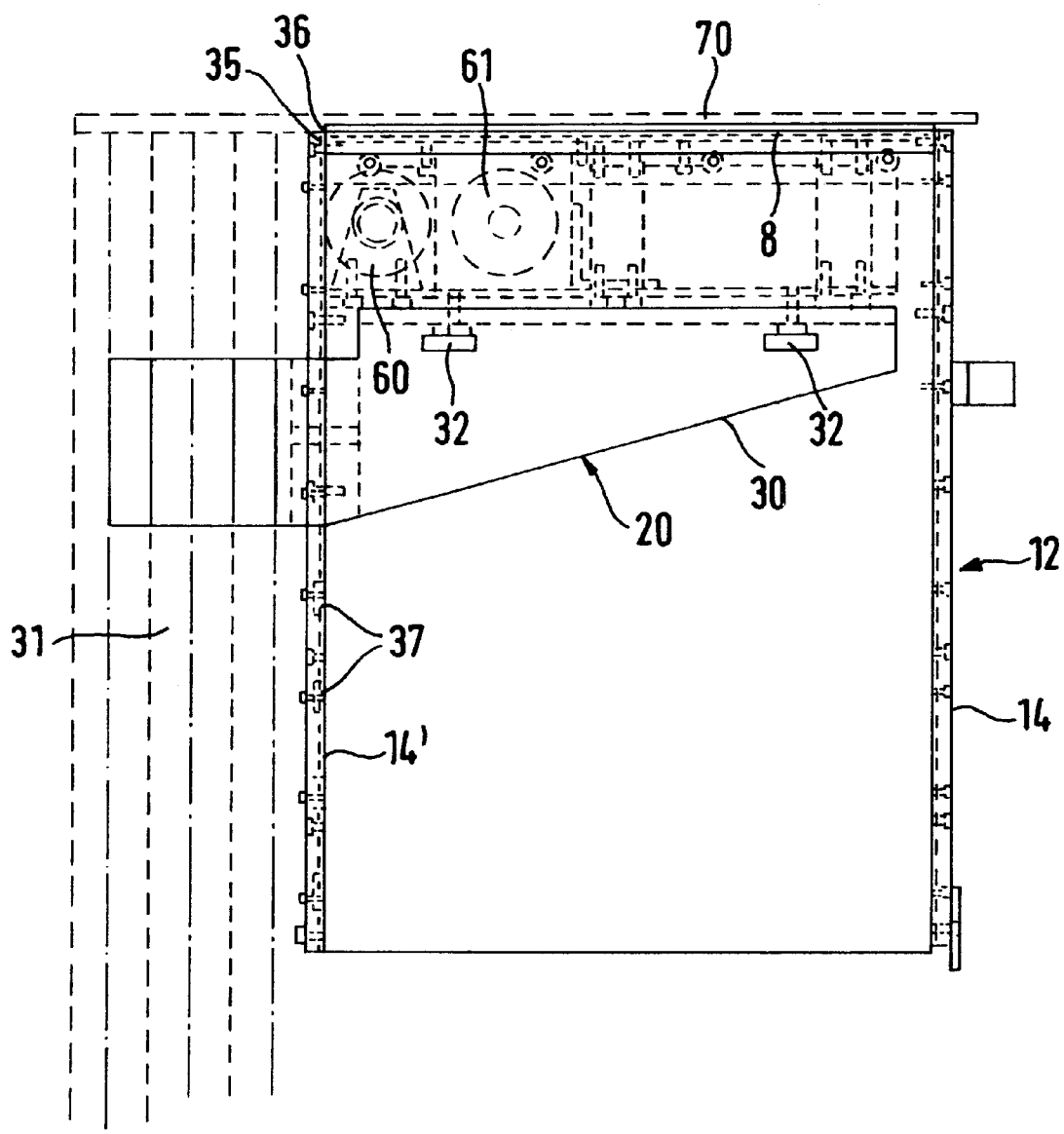
FIG. 3 is a detailed sectional view of an interchangeable container according to FIG. 1 with the work piece platform in a upper position.

Referring to the embodiments shown in FIGS. 1, 3 and 4, the supporting device consists of support arms 30 arranged in a guiding device 31 in the region of the rear wall of the machine housing. On the support arms 30, the work piece platform 8 is releasably mounted by screw elements 32. If, as in FIG. 3, the work piece platform 8 is located in an upper or medium position of the interchangeable container 12, the support arms 30 will engage through engagement recesses 33 arranged in a vertical direction in the rear side wall 14'.

As an alternative, it is also possible, according to FIG. 2, to firmly integrate the supporting device 40 in the lower portion of the interchangeable container 12, for example to form a scissor-type jack 41 which can be raised or lowered continuously using a spindle drive 42. In a further alternative embodiment, the supporting device 40 reaches into the interchangeable container from underneath, and a linear guide, preferably a telescoping linear guide, is provided for raising and lowering the supporting device.

In this case, the interchangeable container 12 can be formed without the engagement recesses 33 in the rear side wall 14', since no elements of a supporting device have to reach through the rear side walls 14'.

Next, it is again referred to FIGS. 1, 3 and 4.

In order to cover the engagement recesses 33 in the area above the work piece platform 8 in a powder proof manner, a roller shutter 34 is provided, the upper end 35 of which is mounted to the upper edge 36 of the rear side wall 14'. The roller shutter 34 is a steel roller shutter and consists of a magnetizable material. In addition to the engagement recesses 33, magnet elements 37 are arranged which cause the roller shutter 34 to be attracted to the inner side of the side wall 14' in a sinter powder.proof manner.

The work piece platform 8 is formed by two spaced bottoms arranged in parallel to each other, the upper bottom forming the work piece holder and the lower bottom or a corresponding bottom-like element resting on the supporting device 20. Between the two bottoms, a deflection pulley 60 for the roller shutter 34 and a spring loaded winding device 61 are provided.

Between the inner sides of the side walls 14 of the interchangeable container and the outside edges of the work piece platform 8, a powder sealing element is operative which is formed by a silicone plate (not shown) the outer dimensions of which are adapted to the inner dimensions of the container walls.

The interchangeable container 12 can be inserted in a drawer-like fashion into guides 70 of the machine housing 2 and in addition comprises support angles 71 protruding laterally from the upper edge of the interchangeable container 12 and resting on the guides 70 of the machine housing 2.

Figure 5:
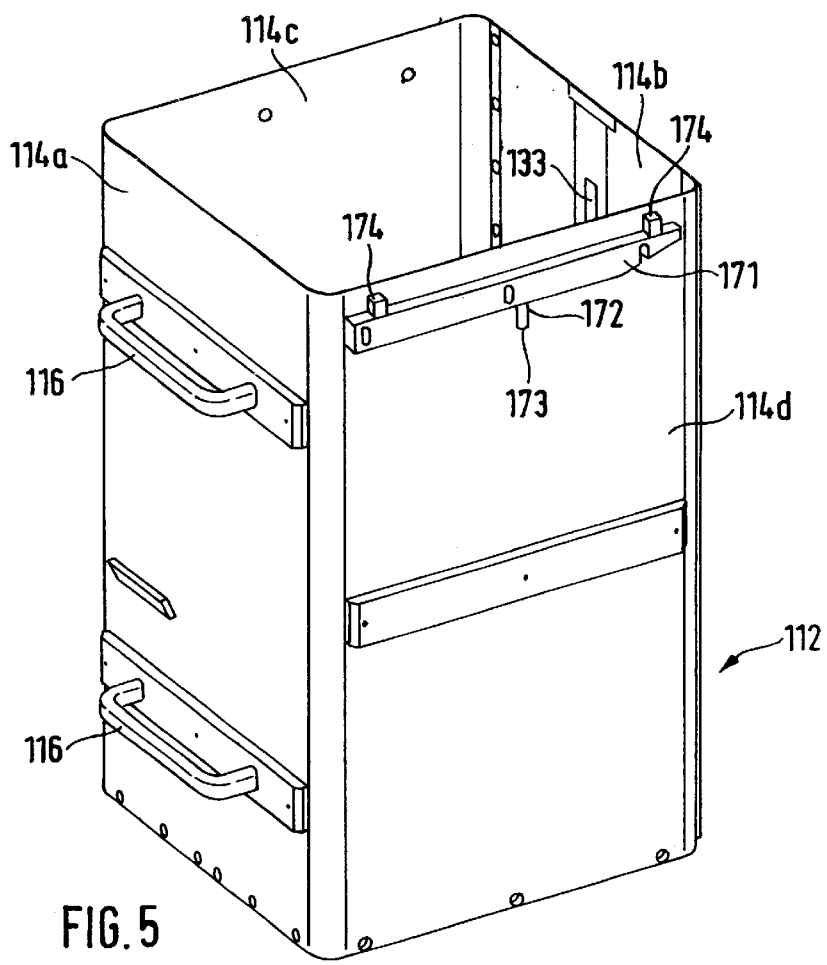
FIG. 5 is a perspective view of an embodiment of the interchangeable container.
Figure 7:
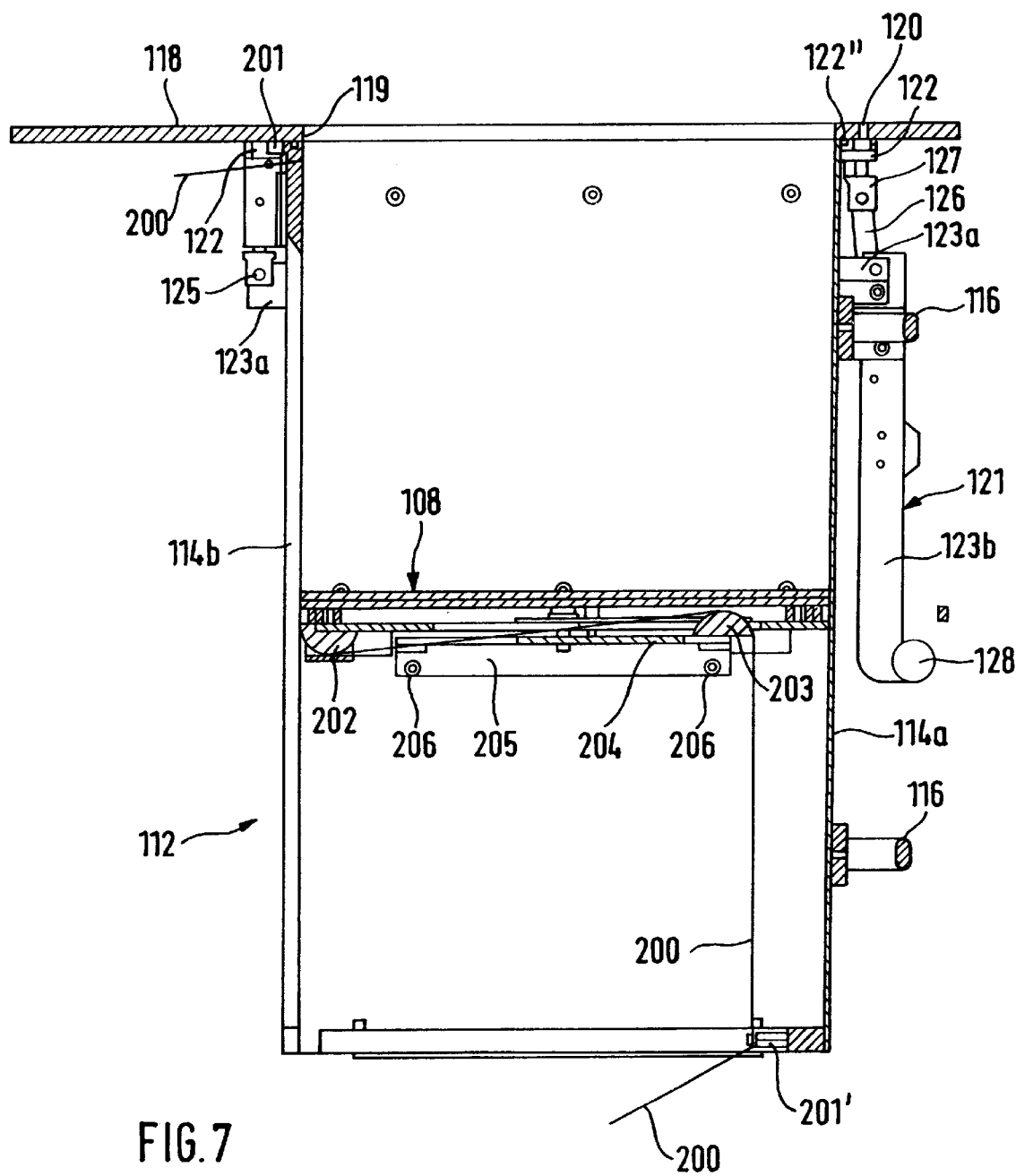
FIG. 7 is a schematic cross sectional view of the interchangeable container of FIG. 5 in a built-in state.

A further embodiment of an interchangeable container 112 is illustrated in FIGS. 5 and 7. The interchangeable container 112 is preferred, but is not necessarily of square cross section and comprises four side walls 114a, 114b, 114c and 114d, forming a shaft in which, as shown in FIG. 7, a work piece platform 108 is arranged in a height-adjustable fashion. At the front side wall 114a which, if the interchangeable container 112 is inserted in the machine, is facing an insertion opening into the building space, the interchangeable container 112 comprises two handles 116 by which the interchangeable container can be pushed into or pulled out of the machine just like a drawer. At each of the side walls 114c, 114d adjacent to the front side wall 114a, the interchangeable container comprises support rails or support angles 171 at a predetermined distance from its upper edge and protruding laterally away from it. Each support angle 171 comprises at its lower side a centered pin 172 protruding vertically to the bottom and having a rounded free end 173 and at its upper side two lugs 174. At its rear side wall 114b opposite to its front side wall 114a and facing the rear wall of the machine housing delimiting the building space, the interchangeable container 112 comprises a substantially centered slot-shaped engagement recess 133 extending in the longitudinal direction, i.e. the displacement direction, of the work piece platform 108, for the engagement by a support arm of the supporting device. The engagement recess 133 extends all the way to the lower edge of the interchangeable container, in order to enable the insertion of a support arm provided laterally at an elevating device in the machine housing.

In this embodiment, a powder sealing element (not shown) is provided between the inner sides of the side walls 114a, 114b, 114c of the interchangeable container 112 and the outer edge of the work piece platform 108, comprising a layer or a combination of several layers having a sealing effect and the outer dimensions of which correspond to the inner dimensions of the interchangeable container in cross section, for example rubber, silicone and/or felt, and which is resiliently connected to the bottom side of the work piece platform, for example by helical steel springs, and, if required, by a contact ledge. This allows manufacturing tolerances of the interchangeable container, as well as positioning and alignment errors to be compensated.

Figure 6:
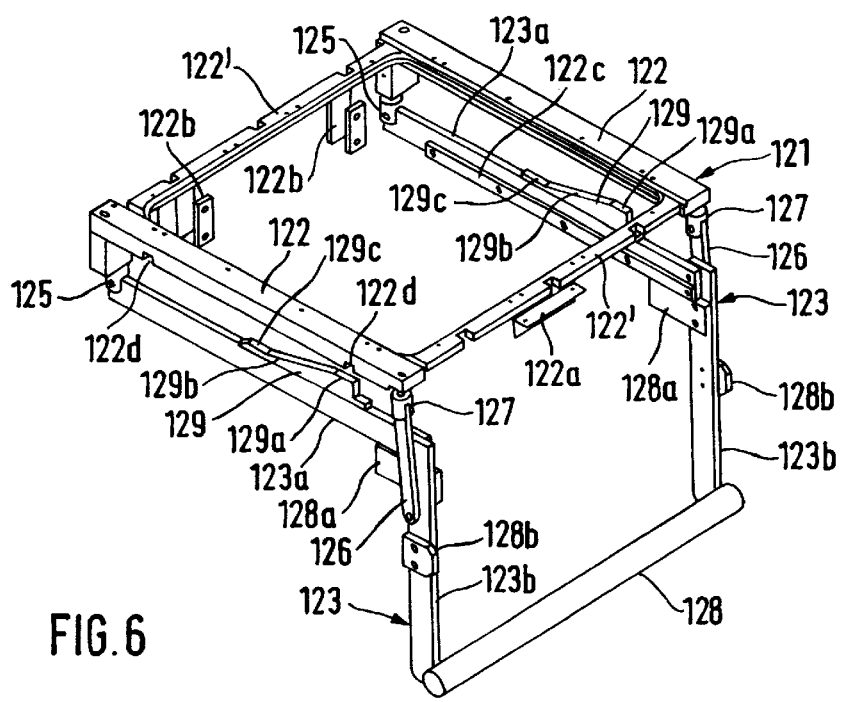
FIG. 6 is a perspective view of an elevating and clamping device for clamping the interchangeable container in the building space.

As can be seen from FIG. 7, a working plate 118 provided in the building space 3, comprising a recess 119, the contour of which corresponds to the cross section of the interchangeable container 112. At the bottom side of the working platform 118, and elevating and clamping device 121 is mounted, as shown separately in FIG. 6. The clamping device comprises a square frame substantially corresponding to the contour of the interchangeable container and having two oppositely arranged frame portions 122 and connecting struts 122' connecting them. The frame is secured to the bottom side of the working plate 118 adjacent to the recess 119 for example by screws 120. At the frame potions 122, there is provided a knee lever system consisting of one knee lever 123 having a first leg 123a and a second leg 123b pivotally connected to the latter. The first leg is pivotally connected at one of its ends to one end of the frame portion 122 via a joint 125 and with its other end pivotally connected to the second leg 123b. The second leg 123b is connected via a connecting rod 126 pivotally hinged at the second leg via a joint 127 to the other end of the frame portion 122. The free ends of the second legs 123b of the two knee levers 123 are connected to each other via a gripping rod 128 for actuating the clamping device. The first leg 123a of the knee lever comprises at its upper side facing the frame potion 122 a specially shaped shoulder part 129 comprising a first section 129a having a surface aligned in parallel to the upper side of the first leg 123a, a second section 129b adjacent thereto, having a downwards tilted surface towards the joint 125, and a third section 129c adjacent thereto, having a surface which is again aligned in parallel to the surface of the leg. The clamping device 121 is secured to the working plate 118 in the building space 3 such that the gripping rod 128 is facing the insertion opening of the machine for the interchangeable container. The shoulder part 129 is secured to the first leg 123a such that the free end 173 of the pin 172 will rest at the support angle 171 of the interchangeable container 112 in the locked state on the third section 129c. In addition, a powder proof attachment of the frame at the working plate 118 is achieved by a circumferential seal 122" which is housed in a groove extending within the frame portions 122 and the connecting struts 122'''.

In addition, the frame which is formed by 122 and 122' has the function of centering the interchangeable container towards the opening 119 in the working plate 118. When being raised, the interchangeable container will be guided in one plane by an angle 122a and support surfaces 122b and laterally through rails 122c such that it will glide smoothly and reliably into the correct position given by the parts 122, 122'. To that end, the angle 122a and the support surfaces 122b are made of a gliding material such as PTFE. The vertical position of the interchangeable container is determined by the lugs 174 shown in FIG. 5 which are provided in pairs on the support angles 171 and which rest on a corresponding counterpart in a corresponding recess 122d in the frame portions 122. All supports and lugs are made from hardened steel in order to guarantee perfect positioning over a long period of time.

The motion of the knee lever joint is limited in one direction by a stop 128a (interchangeable container locked) and in the other direction by a stop 128b.

For sealing the engagement recess 133 in an area above the work piece platform 108, there is provided a sealing device, shown in FIG. 7, in the form of a flat tape 200, preferably from steel, having a width larger than the width of the engagement recess 133. The tape 200 is firmly clamped at a first clamping point at the upper edge of the rear side wall 114b of the interchangeable container above the engagement recess 133 via a clamping jaw 201. Further, the tape 200 is clamped at a second clamping point substantially diagonally opposite to the first clamping point at the lower edge of the front side wall 114a of the interchangeable container via a clamping jaw 201. At the bottom side of the work piece platform 108, there are provided a first semi-cylinder 202 and a second semi-cylinder 203 spaced from each other and both preferably made of a gliding material such as synthetic material over which the tape 200 is guided. The first semi-cylinder 202 is arranged such that with its curved surface it faces away from the bottom side of the work piece platform 108, while the second half cylinder 203 is arranged on an auxiliary construction 204 arranged in parallel to the work piece platform 108 at the bottom side thereof, and with its curved surface facing towards the bottom side of the work piece platform 108, that is, in a direction opposite to the direction of the first semi-cylinder 202. Thus, the tape is guided while being tensioned. The radius of curvature of the semi-cylinder is chosen such that the tape 200 guided on top of it will not be bent and can easily glide on top of it. The tape 200 is guided from its first clamping point via the engagement recess 133 and thereafter passes across the curved surface of the first semi-cylinder 202 and then across the curved surface of the second semi-cylinder 203 from where it is guided to its second clamping point. The length of the tape 200 is constant and dimensioned such that the tape is tightly guided and, due to the pressure of the work piece platform, will fit closely and seal the engagement recess 133. As in the first embodiment, magnet elements may be provided in addition to the engagement recess 133 by which the tape, if made from steel or another magnetic material, is additionally kept at the edge delimiting the engagement recess 133. Since the steel tape 200 has a constant length, no winding is needed as in the case of the steel roller shutter of the first embodiment.

The work piece platform 108 comprises a holder 205 at its bottom side for engagement with a coupling device of a support arm 300, shown in FIGS. 9 to 14. To that end, the holder 205 comprises four sockets 206 arranged in a square at its bottom side and designed for engagement with the coupling device. As can be seen from FIGS. 8 to 11, the support arm 300 supporting the work piece platform 108 during operation comprises a mounting part 301 connected to the elevating device in the machine housing and arranged outside the interchangeable container during operation. From the mounting part 301, a connecting part 302 extends at a right angle and is dimensioned such that it can easily be displaced within the engagement recess 133. In use, the connecting part 302 extends across the engagement recess 133. The connecting part 302 is connected to the coupling device of the support arm. The coupling device comprises two struts 305 connected to each other at one of their ends via a connecting part 304 and in the form of a hollow profile at which a support plate 306 to be connected to the holder 205 of the work piece platform is pivotally mounted on a pivot axis 307. At their upper end, the support plates 306 comprise engagement parts in the form of pins 308 resiliently mounted for example via a leaf spring 308a (FIG. 14) which are formed and arranged such that they engage the sockets 206 of the holder 205 in the coupled state. The angle of the pointed end of the pins 308 is formed flat enough that a reverse motion by vertical forces can be ruled out. Thus, locking action is achieved. The sockets 206, the pins 308 and the support plates 306 are made from a hardened material, preferably hardened steel.

Figure 9:
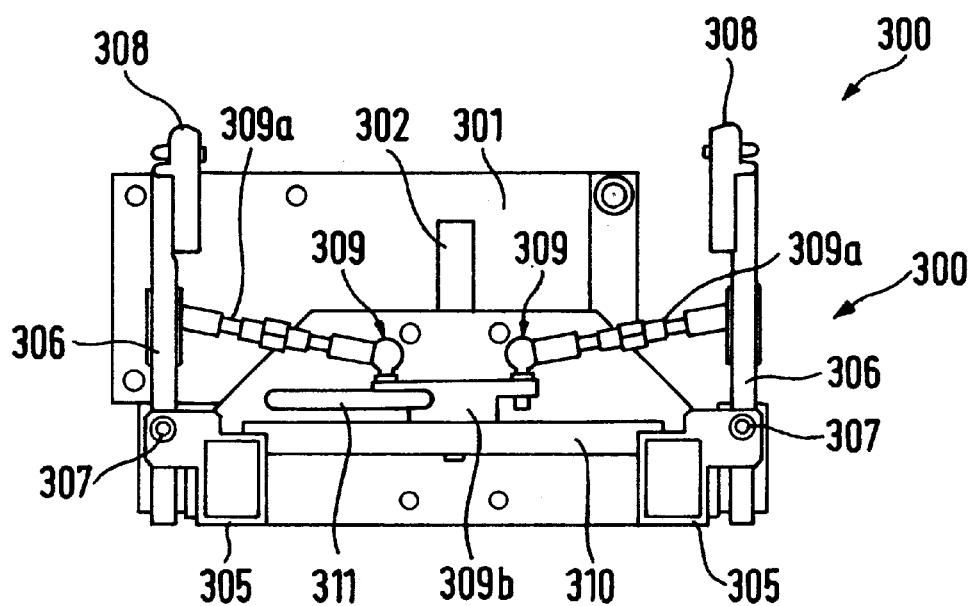
FIG. 9 is a front view of an embodiment of a support arm having a coupling device for coupling to the work piece platform, in a first coupled position, but without a work piece platform.
Figure 10:
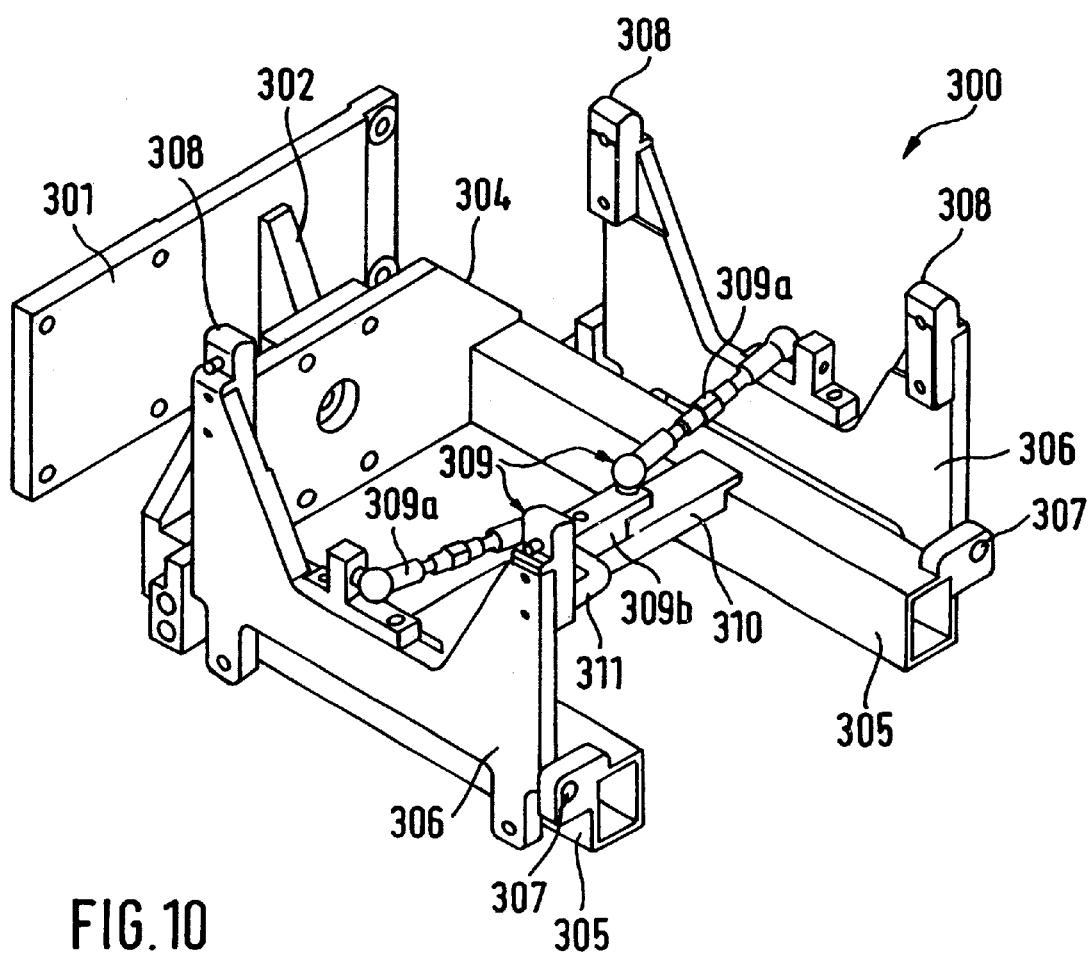
FIG. 10 is a perspective view, as seen at an angle from above, of the embodiment of the support arm according to FIG. 9.
Figure 11:
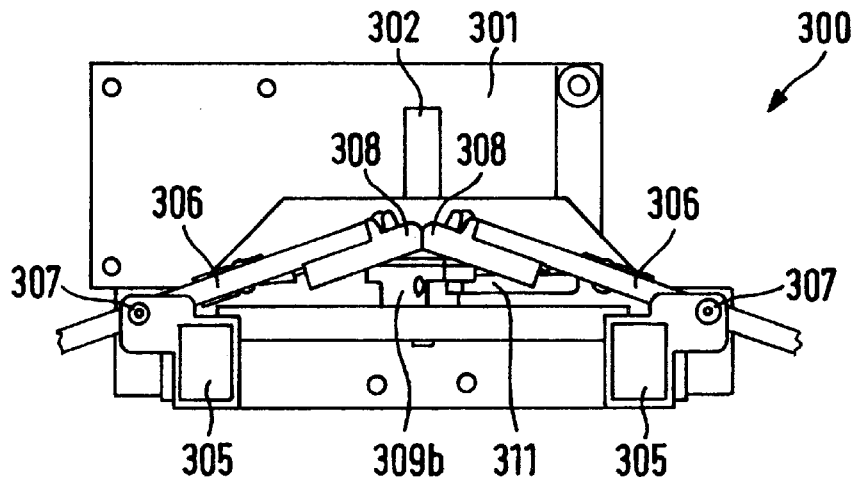
FIG. 11 is a front view of the support arm having the coupling device of FIG. 9, in a second position.
Figure 12:
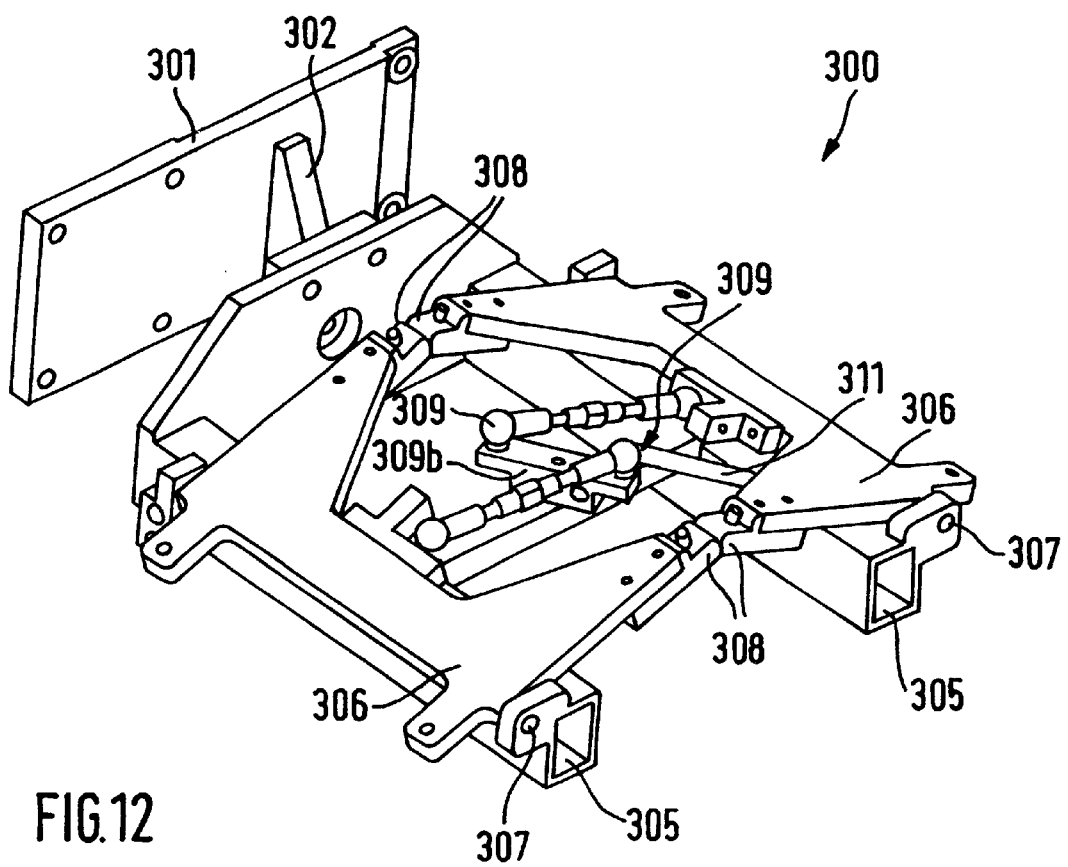
FIG. 12 is a perspective view of the support arm with the coupling device in the second position according to FIG. 11.

The support plates 306 can be pivoted via a pivot mechanism from a first position shown in FIGS. 9 and 10 and where the support plates are vertical and the pins 308, in use, engage the sockets 206, as well as a second position shown in FIGS. 10 and 11 and where the support plates 306 are folded towards each other and no connection to the work piece platform 108 exists. The pivot mechanism consists of a knee lever system of two knee levers 309 each having a first leg 309a hinged with its one free end at the adjacent support plate 306 and having a second leg 309b pivotally connected to each one of the first legs 309a at its free ends and commonly provided for both knee levers and pivotally mounted on a cross strut 310 connecting the struts 305. In addition, a pivot lever 311 is arranged at the second leg 309b by which pivot lever 311, when actuated, the knee lever system may be actuated. To that end, the pivot lever acts on the second leg 309b such that it can be rotated relative to the cross strut 310. When the pivot lever 311 is pivoted the knee levers can be brought from their stretched state to their folded state and vice versa, permitting the support plates to be pivoted from their upright state into the folded together state and vice versa.

Figure 8A:
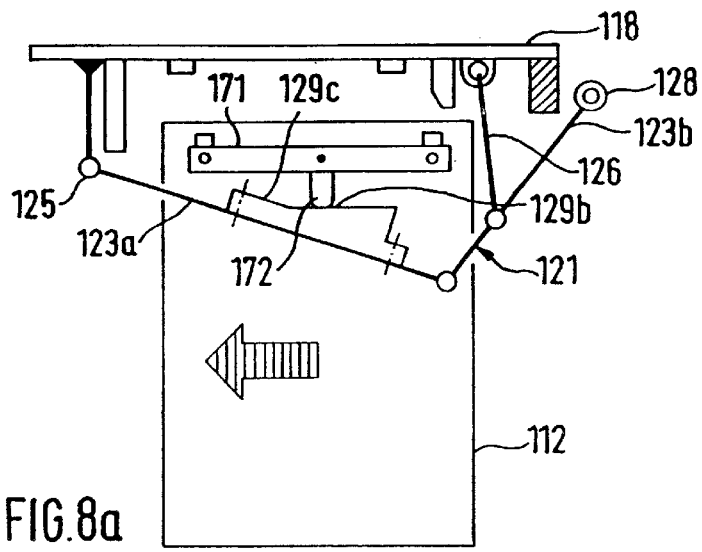
FIGS. 8*a* to 8*c* are schematic cross sectional views showing the operation of the clamping device of FIG. 6, by which the interchangeable container is lifted and clamped to a working plate in the building space, in a first (FIG. 8*a*), a second (FIG. 8*b*) and a third (FIG. 8*c*) position, respectively.
Figure 8B:
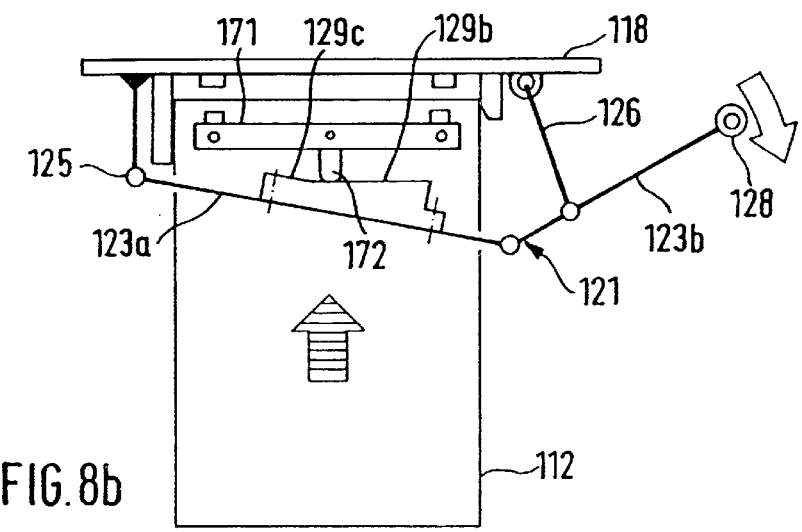
Figure 8C:
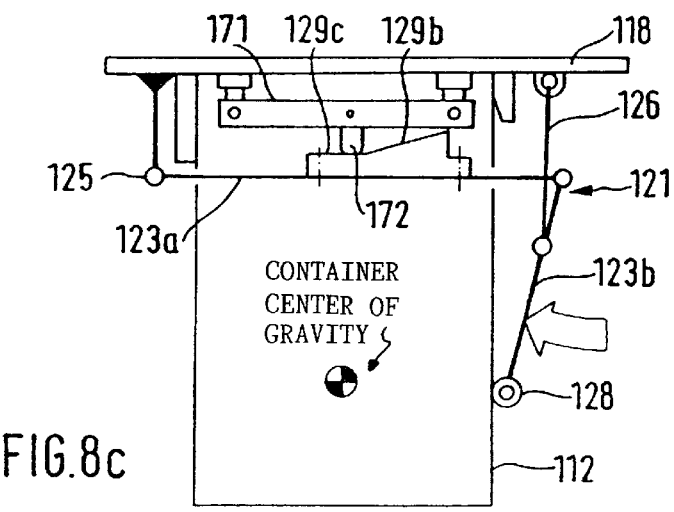

In use, the clamping device 121 is initially located in the empty building space 3 in the position where the gripping rod 128 is on the upper side, i.e. facing the working plate 118. The connecting point of the legs 123a, 123b of the knee levers is then located in a first lower position and the ends of the legs 123a, 123b are facing towards the working plate 118. Next, an empty interchangeable container 112 will be introduced into the building space 3 such that the laterally protruding support angle 171 will be shifted into a position between the first leg 123a of the knee levers 123 shown in FIGS. 6 and 7 and the frame portion 122. In the process, the pin 172 comes to rest with its free end 173 on the second section 129b of the respective connecting part. Next, the gripping rod 128, as shown in FIG. 8b, is pushed down such that the interchangeable container will hit the support 122b. Due to the centering motion of the interchangeable container, the pin 172 will glide on the sloping surface of the second section 129b until it will come to rest on the third surface 129c (FIG. 8c). In this second upper position of the knee levers, the first leg 123a is horizontally aligned while the second leg 123b is pointing downwards with the end position of the gripping rod 128 being given by the support 128a. As shown in FIG. 8c, the dimensions of the clamping device are such that the center of gravity of the container will be roughly below the location of the support of the pin 172. In the position shown in FIG. 8c, the interchangeable container is clamped against the supports in the frame portions 122 and thus against the working plate 118 which forms an abutment, the clamping being substantially carried out by spot interaction of the clamping force of the first legs 123a and the respective pin.

Figure 13:
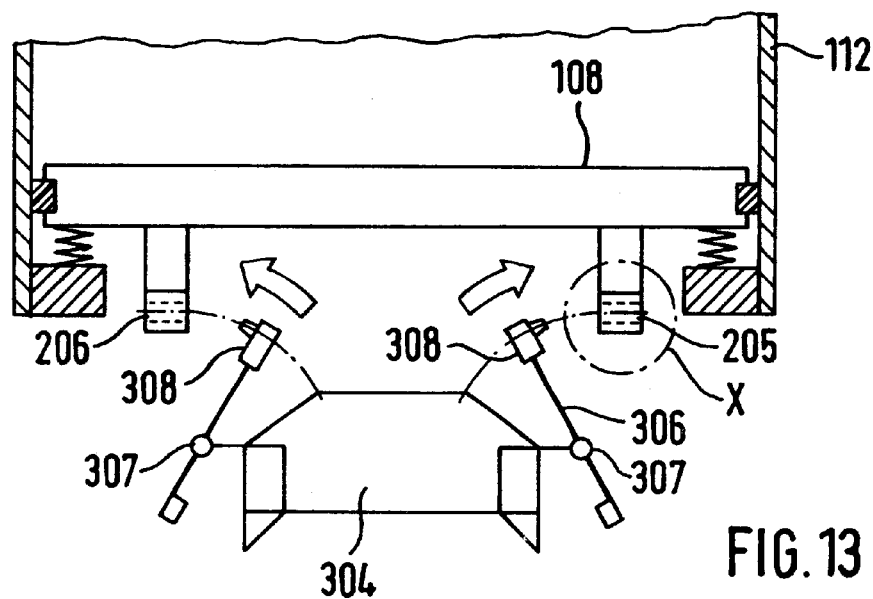
FIG. 13 is a schematic cross sectional view showing the operation of the coupling device of FIGS. 9 to 11 in association with the interchangeable container.
Figure 14:
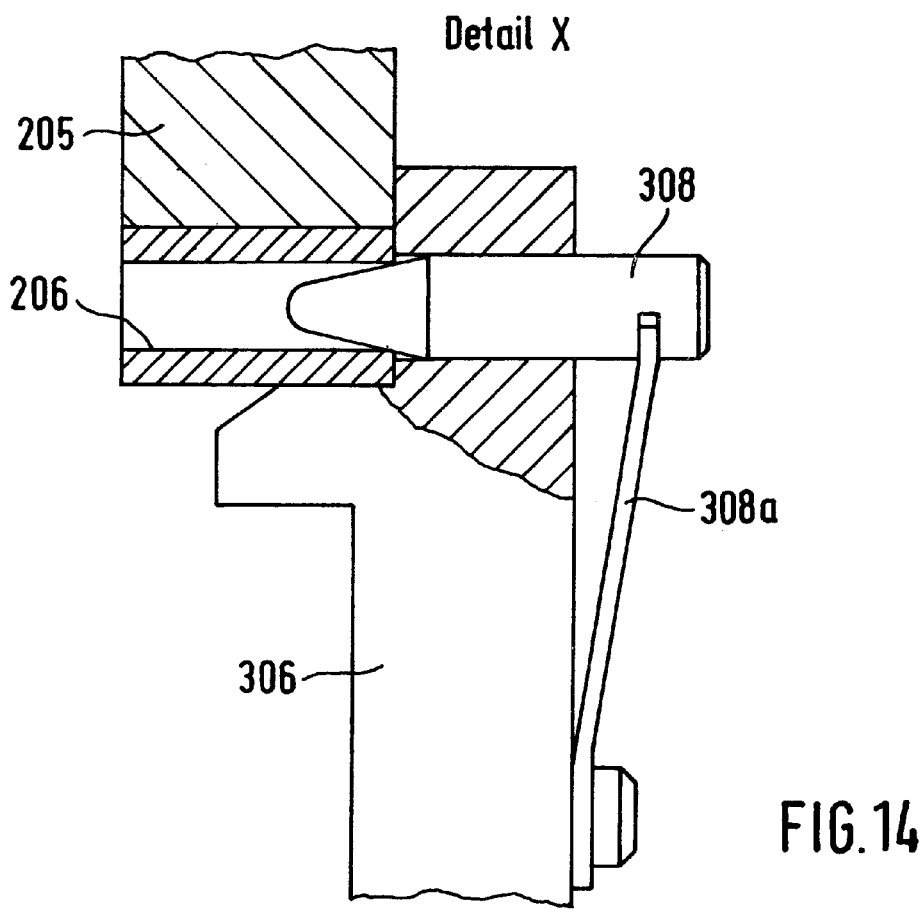
FIG. 14 is an enlarged cross sectional view of detail X of FIG. 13.

The work piece platform 108, initially located in its lowermost position, will then be coupled to the support arm 300 previously introduced from underneath, whereby the pivot lever 311 is brought in the position shown in FIGS. 9 and 10, causing the knee levers 309 to be brought into their stretched position and thus the support plates 306 being pivoted into their upright position. Next, as shown in FIGS. 13 and 14, the pins 308 are pressed into the sockets 206 of the holder 205, causing the support arm to be coupled. The positioning is carried out vertically by means of the sockets resting on the part 306.

Thereafter, the building of the part in the interchangeable container can take place. To that end, the work piece platform, supported by the support arm, is displaced towards its uppermost position by actuating the height displacement means and a layer of a powdery material will be deposited and sintered at the locations corresponding to the part. Next, the work piece platform is lowered by a distance corresponding to the layer thickness and the new powder will be deposited. By lowering the work piece platform, the engagement recess is simultaneously sealed by the steel tape 200 such that no powder will fall out through the engagement recess 133. Due to the guiding of the steel tape at the bottom side of the work piece platform 108, it is guaranteed that the part of the engagement recess located above the work piece platform will always be covered.

After completion of the part, the work piece platform is transferred into the withdrawal position (lowermost position of the work piece platform). Next, the work piece platform is decoupled from the drive by pivoting the pivot lever to the right, causing the support plates 306 to be pivoted into the position shown in FIG. 12. This process generates sufficient space in the vertical direction for lowering the interchangeable container. This lowering is carried out using the elevating and clamping device described above by carrying out the steps according to FIGS. 8a to 8c in the reverse order. Then, the interchangeable container together with the part formed in it will be withdrawn. Using the handles 116, the interchangeable container is then transferred to a location for further processing or cooling. In an alternative embodiment, the interchangeable container is taken out by means of a hoist (not shown) which can be driven into or close to the building space. This is advantageous because the interchangeable container including the part formed therein which can be very heavy, does not have to be carried by hand.

Due to the special construction of the supporting device with the coupling device, it is possible that the space required for lowering the interchangeable container is not created by displacing the z-axis. Thus, the maximum possible displacement distance can entirely be used for the building of parts.

The invention is not limited to a laser sintering machine. It can be applied to all rapid prototyping devices where a part is built in a layer-by-layer fashion on a building or work piece platform from a material that can be solidified.

What is claimed is:

1. An apparatus for producing a three-dimensional part by successive layer-by-layer solidification of a solidifiable material, which is solidified at locations corresponding to the cross section of said part, said apparatus comprising:

a machine housing;

a building space provided in the machine housing;

an interchangeable container forming a delimiting frame for said material within said building space, said container having a work piece platform; and a supporting device, on which said work piece platform is supported during operation of the apparatus, said interchangeable container further comprising a rear side wall having a recess extending vertically, and said supporting device engaging said work piece platform through said recess.

2. The apparatus of claim 1, wherein said work piece platform is adjustable in position within said delimiting frame and is structured and arranged for integration in the container as the container bottom.

3. The apparatus of claim 1, said apparatus further comprising:

exit optics of a sintering laser located in said building space; and a material feeding device, said material feeding device comprising a reservoir and a coating device for feeding a powdery sinter material onto said work piece platform;

wherein said work piece platform is arranged below said building space.

4. The apparatus of claim 1, wherein said interchangeable container has sidewalls and said work piece platform is structured and arranged to be latched to said side walls to form a container bottom such that said interchangeable container with the work piece platform forming said container bottom can be withdrawn from said building space as a unit.

5. The apparatus of claim 4, wherein the side walls and the work piece platform have alignable bores, said apparatus further comprising sliding plugs for insertion into the aligned bores to latch the work piece platform to the side walls.

6. The apparatus of claim 1, wherein said interchangeable container comprises four side walls substantially perpendicular to each other and has, in plan view, a substantially rectangular or square cross section in which said work piece platform is movable in a height-adjustable manner.

7. The apparatus of claim 1, wherein said machine housing comprises a machine rear wall and said supporting device is moved in an area of said machine rear wall.

8. The apparatus of claim 1, wherein said supporting device is incorporated into a lower portion of said interchangeable container as a component thereof.

9. The apparatus of claim 1, wherein said machine housing has side walls surrounding said building space, said side walls containing guides, and wherein said interchangeable container is structured and arranged to be inserted into said guides.

10. The apparatus of claim 1, wherein said interchangeable container comprises supporting angles at an upper end, wherein said supporting angles extend laterally away from said container and engage the guides on said side walls of said machine housing.

11. The apparatus of claim 1, wherein said recess has a powder seal that keeps a powder material in an area above the work piece platform.

12. The apparatus of claim 11, wherein said powder seal is a silicone plate having dimensions that are structured and adapted to the sidewalls of said interchangeable container.

13. The apparatus of claim 1, wherein said recess is sealed by a roller shutter.

14. The apparatus of claim 13, wherein said rear side wall of the container has an upper edge and said roller shutter has an upper end, which is mounted to said upper edge of the rear side wall.

15. The apparatus of claim 13, wherein said roller shutter is a steel roller shutter.

16. The apparatus of claims 13, further comprising magnet elements positioned adjacent to said roller shutter to cooperate therewith.

17. The apparatus of claim 13, further comprising a deflection pulley having a rear edge that is aligned with an inner surface of said rear side wall for guiding said roller shutter.

18. The apparatus of claim 1, wherein said work piece platform comprises an upper and a lower bottom spaced from and arranged parallel to each other, the upper bottom providing a work piece holder and the lower bottom resting on said supporting device.

19. The apparatus of claim 1, wherein said interchangeable container has sidewalls and said work piece platform has outer edges, said apparatus further comprising a powder compression element that is active between said sidewalls and said outer edges.

20. The apparatus of claim 1, wherein said work piece platform is connected to said supporting device during operation of the apparatus.

21. The apparatus of claim 1, wherein said interchangeable container comprises a recess through which the supporting device can be engaged and in which the supporting device can be displaced.

22. The apparatus of claim 21, further comprising a powder seal between the recess and said building space such that no unsolidified material can escape.

23. The apparatus of claim 1, further comprising a telescoping linear guide that connects to said supporting device for raising and lowering said work piece platform.

24. The apparatus of claim 1, further comprising a working plate that is provided in the building space, said working plate having a bottom side and a clamping device for engaging the interchangeable container at the bottom side.

25. The apparatus of claim 1, further comprising a coupling device for coupling and decoupling said work piece platform from said supporting device.

26. The apparatus of claim 1, further comprising a controllable heating device in said interchangeable container.

27. The apparatus of claim 1, further comprising a controllable heating device in a side wall of said interchangeable container.

28. The apparatus of claim 1, further comprising a controllable heating device in said work piece platform.

29. The apparatus of claim 1, wherein said supporting device is structured and arranged to lower the interchangeable container without displacing the supporting device.

30. The apparatus of claim 1, further comprising means for lifting and locking the interchangeable container simultaneously.

31. An apparatus for producing a three-dimensional part by successive layer-by-layer solidification of a solidifiable material, which is solidified at locations corresponding to the cross section of said part, said apparatus comprising:

a machine housing;

a building space provided in the machine housing;

an interchangeable container forming a delimiting frame for said material within said building space, said container having a work piece platform; and a supporting device, on which said work piece platform is supported during operation of the apparatus;

wherein said interchangeable container comprises a recess through which the supporting device can be engaged and in which the supporting device can be displaced;

wherein said recess is formed in a slot-shaped manner in a direction of displacement of the supporting device, further comprising a tape seal mounted to a wall of said interchangeable container above said recess, said tape seal surrounding said recess and being pressed against the wall by said work piece platform.

32. The apparatus of claim 31, wherein said tape seal has one end that is clamped in a region of a lower edge of said interchangeable container.

33. The apparatus of claim 31, further comprising two slideways positioned in a vicinity of the edges of said work piece platform, wherein said tape seal is tensioned by means of said slideways.

34. The apparatus of claim 31, wherein said tape seal is a steel tape.

* * * * *